United States Patent
Watanabe

(10) Patent No.: US 10,780,779 B2
(45) Date of Patent: Sep. 22, 2020

(54) BEHAVIOR CONTROL APPARATUS FOR A FOUR-WHEEL DRIVE VEHICLE

(71) Applicant: Toyota Jidosha Kabushiki Kaisha, Toyota-shi, Aichi-ken (JP)

(72) Inventor: Ryochi Watanabe, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/512,821

(22) Filed: Jul. 16, 2019

(65) Prior Publication Data
US 2020/0031225 A1    Jan. 30, 2020

(30) Foreign Application Priority Data
Jul. 27, 2018 (JP) ................................. 2018-141299

(51) Int. Cl.
*B60K 23/08* (2006.01)
*B60K 17/02* (2006.01)
*B60K 17/346* (2006.01)

(52) U.S. Cl.
CPC .......... *B60K 23/0808* (2013.01); *B60K 17/02* (2013.01); *B60K 17/3462* (2013.01); *B60K 2023/085* (2013.01)

(58) Field of Classification Search
CPC ............... B60K 17/3462; B60K 23/08; B60K 23/0808; B60K 2023/085; B60W 10/02; B60W 10/119; B60W 10/184; B60W 30/045; B60W 30/18009; B60W 30/18109; B60W 30/18145
See application file for complete search history.

(56) References Cited

U.S. PATENT DOCUMENTS

| | | | | |
|---|---|---|---|---|
| 5,456,641 | A * | 10/1995 | Sawase | B60K 17/3462 180/197 |
| 7,493,982 | B2 * | 2/2009 | Kurosawa | B60K 17/3462 180/247 |
| 2004/0267427 | A1 * | 12/2004 | Suzuki | B60T 8/1769 701/69 |
| 2007/0029127 | A1 | 2/2007 | Mori et al. | |
| 2015/0096814 | A1 * | 4/2015 | Maeda | B62D 11/003 180/6.28 |

FOREIGN PATENT DOCUMENTS

| | | |
|---|---|---|
| JP | H10-203333 A | 8/1998 |
| JP | 2007-045194 A | 2/2007 |

* cited by examiner

*Primary Examiner* — Edwin A Young
(74) *Attorney, Agent, or Firm* — Dinsmore & Shohl LLP

(57) ABSTRACT

A behavior control apparatus for a four-wheel drive vehicle comprising a driving unit, front and rear wheel driving torque transmission paths that transmit driving torques of the driving unit to front and rear wheels, respectively, and control unit. The rear wheel driving torque transmission path includes a speed increasing device for increasing speed of the rear wheels relative to the front wheels and two clutches for the left rear wheel and right rear wheel disposed between the speed, increasing device and the left rear wheel and the right rear wheel, respectively. The control unit engages the clutch on the turning inside when the vehicle is in oversteer state during turning under braking in a situation where the two clutches are disengaged.

5 Claims, 8 Drawing Sheets

BEHAVIOR CONTROL APPARATUS FOR A FOUR-WHEEL DRIVE VEHICLE

CROSS-REFERENCE TO RELATED APPLICATION

This application claims priority to Japanese Patent Application No. JP2018-141299 filed on Jul. 7, 2018, the content of which is hereby incorporated by reference in its entirety into this application.

BACKGROUND

1. Technical Field

The present disclosure relates to a behavior control apparatus for a four-wheel drive vehicle.

2. Description of the Related Art

In a vehicle, such as an automobile, as behavior control which controls oversteer of a vehicle during turning under braking, behavior control of a braking force control type which gives an anti-spin moment to the vehicle by a braking force difference between right and left wheels is well known in the art. For example, in Japanese Patent Application Laid-open Publication No. H10-203333, behavior control of a braking force control type is described, in which in a slow turn, a turning outer rear wheel is braked without braking a turning inner rear wheel, and in a sharp turn, a braking force of the turning outer rear wheel is temporarily set to zero and then gradually increased without braking the turning inner rear wheel.

According to this type of behavior control, when a vehicle turns slowly, an anti-spin moment can be applied to the vehicle by a braking force difference between the left and right rear wheels, and oversteer of the vehicle can be suppressed. In addition, when the vehicle turns sharply, a braking force of the turning outer rear wheel is controlled to zero once, so that a sufficient lateral force can be generated on the turning outer rear wheel, thereby a yaw moment of the vehicle can be reduced by the lateral force, and then the braking force of the turning outer rear wheel is gradually increased to apply an anti-spin moment by the braking force difference to the vehicle.

In the behavior control of the braking force control type such as the behavior control described in the Japanese Patent Application Laid-open Publication, braking forces must be increased and decreased, so that braking pressures must be increased and decreased. In order to increase and decrease the braking pressures, it is necessary to open and close control valves of a braking actuator, drive an oil pump and the like, and thus, generation of operation noise cannot be avoided. In particular, depending on the structure of the braking actuator, it is inevitable that a brake pedal unnaturally moves in the stepping-in direction when the braking pressures are increased. Therefore, in the behavior control of the braking force control type, although it is possible to suppress oversteer of the vehicle, it cannot be avoided that an occupant or occupants of the vehicle feels a sense of incongruity with the operation noise, and depending on the structure of the braking actuator, it is inevitable that a driver feels incongruence in the movement of the brake pedal.

The above-mentioned problem in the behavior control of the braking force control type is not limited to behavior control in which braking forces of rear wheels are controlled. It also occurs in behavior control of a braking force control type in which braking forces of the front wheels are controlled so that a braking force of a turning outer front wheel becomes higher than a braking force of a turning inner front wheel.

By the way, as one of the four-wheel drive vehicles, a four-wheel drive vehicle is known which includes a front wheel driving torque transmission path and a rear wheel driving torque transmission path, and the rear wheel driving torque transmission pat h includes a speed increasing device for accelerating the rear wheels relative to t he front wheels and two clutches disposed between the left rear wheel and the right rear w heel and the speed increasing device. According to the four-wheel drive vehicle of t his type, it is possible to control the transmission of driving torque to the left rear wheel and the right rear wheel through the rear wheel driving torque transmission path by engaging and disengaging the two clutches.

In particular, as will be described in detail later the two clutches may be disengaged when a driving unit is not generating driving force but if the clutch on the turning inside is engaged when the vehicle is turning under braking, driving torque is applied to the turning inner rear wheel from the front wheel driving torque transmission path through the rear wheel driving torque transmission path. Therefore, an anti-spin moment can be applied to the vehicle without increasing and decreasing braking forces of the wheels.

SUMMARY

The present disclosure provides a behavior control apparatus configured to reduce oversteer of a vehicle without requiring increase or decrease in braking forces of wheels by appropriately controlling engagement and disengagement of clutches during turning under braking in a four-wheel drive vehicle of the type described above.

According to the present disclosure, a behavior control apparatus for a four-wheel drive vehicle is provided which comprises a driving unit, a front wheel driving torque transmission path that is configured to transmit driving torques of the driving unit to left and right front wheels, a rear wheel driving torque transmission path that is configured to transmit driving torques of the driving unit to loft and right rear wheels, including a speed increasing device configured to increase wheel speed of the rear wheels relative to the front wheels and clutches for the left rear wheel and right rear wheel disposed between the speed increasing device and the left rear wheel and the right rear wheel, respectively, and a braking device that is configured to apply braking forces to the front wheels and the rear wheels according to braking operation of a driver.

The behavior control apparatus comprises a control unit configured to control engagement and disengagement of the clutches for the left rear wheel and right rear wheel, and the control unit is configured to engage the clutch on a turning inside to make a wheel speed of the turning inside rear wheel higher than a vehicle speed at a position of the turning inside rear wheel if a degree of oversteer of the vehicle exceeds a control start reference value during turning under braking of the vehicle in a situation where the two clutches are disengaged.

According to the above configuration, the clutch on a turning inside is engaged to make a wheel speed of the turning inner rear wheel higher than a vehicle speed at a position of the turning inner rear wheel if a degree of oversteer of the vehicle exceeds the control start reference value during turning under braking of the vehicle in a situation where the two clutches are disengaged. When the vehicle is being braked, wheel speeds of wheels are lower than vehicle speeds at positions of the wheels. Thus, as will be described in detail later, a wheel speed of a turning inner rear wheel is accelerated from a s peed lower than a vehicle speed at the position of the turning inner rear wheel to a speed higher than the vehicle speed. This acceleration is achieved by transmitting driving forces that front wheels receive from a road surface as reaction forces of the braking forces to the turning inner rear wheel through the front wheel driving torque transmission path and the rear wheel driving torque transmission path. Therefore, an anti-spin moment due to a difference between the braking/driving forces of the left and right rear wheels can be applied to the vehicle to reduce the degree of oversteer of the vehicle.

In this connection, increasing and decreasing braking forces of the wheels to apply an anti-spin moment to the vehicle are not necessary, so that it is not necessary to perform opening and closing control valves of a braking actuator necessary to increase and decrease braking pressures, and there generates no noise. In addition, unnatural movement of a brake pedal associated with increase in braking pressure does not occur. Therefore, it is possible to prevent an occupant or occupants of the vehicle from feeling uncomfortable with the operation noise, and to prevent a driver from feeling uncomfortable with the movement of the brake pedal.

In one aspect of the present disclosure the control unit is configured to disengage the clutch on the turning inside when the degree of oversteer of the vehicle falls below a control end reference value smaller than the control start reference value.

According to the above aspect, when the degree of oversteer of the vehicle falls below the control end reference value smaller than the control start reference value, the clutch on the turning inside is disengaged. Therefore, it is possible to prevent the unnecessary continuation of the engagement of the clutch on the turning inside despite the oversteer state of the vehicle being eliminated.

In another aspect of the present disclosure, the rear wheel driving torque transmission path includes a correcting/disconnecting device that is configured to connect and disconnect the rear wheel driving torque transmission path on the side of the driving unit relative to the speed increasing device by being controlled by the control unit, and the control unit is configured to connect the rear wheel driving torque transmission path by the connecting/disconnecting device when the degree of oversteer of the vehicle exceeds the control start reference value in a situation where the vehicle is turning under braking and the rear wheel driving torque transmission path is disconnected by the connecting/disconnecting device.

According to the above aspect, the rear wheel driving torque transmission path is connected by the connecting/disconnecting device when the degree of oversteer of the vehicle exceeds the control start reference value in a situation where the vehicle is turning under braking and the rear wheel driving torque transmission path is disconnected by the connecting/disconnecting device. Therefore, when the degree of oversteer of the vehicle exceeds the control start reference value in a situation where the rear wheel driving torque transmission path is disconnected, an anti-spin moment can be applied to the vehicle in the same manner as a four-wheel drive vehicle that is not provided with a connecting/disconnecting device, and the degree of oversteer of the vehicle can be reduced.

It is to be noted that "disconnect the rear wheel driving torque transmission path" means changing the rear wheel driving torque transmission path from a state where it can transmit driving torque to a state where it cannot transmit driving torque. On the other hand, "connect the rear wheel driving torque transmission path" means making the rear wheel driving torque transmission path from a state where it cannot transmit driving torque to a state where it can transmit driving torque.

Further, in another aspect of the present disclosure, the control unit is configured to disengage the clutch on the turning inside when a braking force is controlled by anti-skid control on at least one of a turning inner front wheel and a turning inner rear wheel even if the degree of oversteer of the vehicle exceeds the control start reference value.

According to the above aspect, the clutch on the turning inside is disengaged when a braking force is controlled by anti-skid control on at least one of a turning inner front wheel and a turning inner rear wheel even if the degree of oversteer of the vehicle exceeds the control start reference value. Therefore, it can be prevented that anti-skid control is not properly performed because a wheel speed of one of the turning inner front wheel and the turning inner rear wheel is influenced by the other wheel speed through the speed increasing device and the clutch on the turning inside.

Further, in another aspect of the present disclosure, the control unit is configured to engage the clutch on the turning inside even if a braking force is controlled by anti-skid control for at least one of a turning outer front wheel and a turning outer rear wheel in a situation where the degree of oversteer of the vehicle exceeds the control start reference value.

According to the above aspect, the clutch on the turning inside is engaged even if a braking force is controlled by anti-skid control for at least one of a turning outer front wheel and a turning outer rear wheel in a situation where the degree of oversteer of the vehicle exceeds the control start reference value. Therefore, a driving force can be applied to the inner rear wheel to apply an anti-spin moment to the vehicle, which enables to reduce the degree of oversteer of the vehicle and control the braking force by the anti-skid control.

Other objects, other features and attendant advantages of the present disclosure will be readily understood from the description of the embodiments of the present disclosure described with reference to the following drawings.

DETAILED DESCRIPTION

Figure 1:
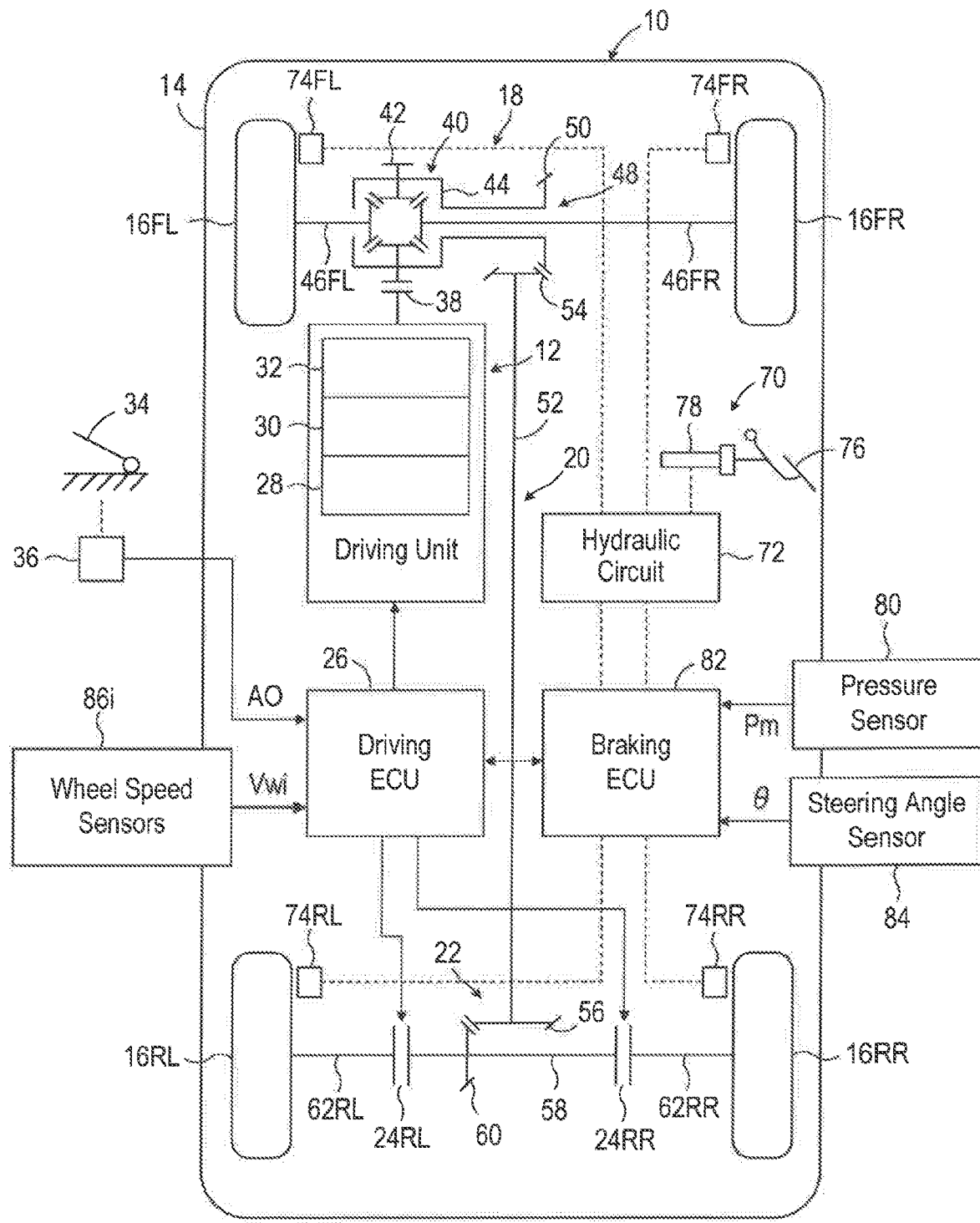
FIG. 1 a schematic configuration view showing a first embodiment a behavior control apparatus for a four-wheel drive vehicle according to the present disclosure.

The present disclosure will now be described in detail with reference to the accompanying drawings.

First Embodiment

The behavior control apparatus 10 according to the first embodiment of the present disclosure is applied to a four-wheel drive vehicle 14 having a driving unit 12. The behavior control apparatus 10 includes the driving unit 12, a front wheel driving torque transmission path 18 for transmitting driving torques of the drive unit to left and right front wheels 16FL and 16FR, and a rear wheel driving torque transmission path 20 for transmitting driving torques of the drive unit to left and right rear wheels 16RL and 16RR. The rear wheel driving torque transmission path 20 includes a speed increasing device 22 for increasing the speed of the rear wheels relative to the front wheels and left rear wheel and right rear wheel clutches 24RL and 24RR that change transmission capacities for driving torque to the left rear wheel 16RL and the right rear wheel 16RR as a result of changing engaging torques.

Further, as described in detail later, the behavior control apparatus 10 has a driving electronic control unit 26 as a control unit for controlling the engaging torques of the left rear wheel and right rear wheel clutches 24RL and 24RR. In the following description and FIGS. 1 and 6, the "driving electronic control unit" is denoted as "driving ECU".

The driving unit 12 is a vehicle driving unit including an engine 28 as a driving torque generating device, a torque converter 30, and an automatic transmission 32, and the engine 28 may be either a gasoline engine or a diesel engine. It should be noted that the drive unit 12 may be an electric motor, and may be any vehicle drive unit known in the art, such as a combination of an engine and a continuously variable transmission, a combination of an engine, an electric motor and a transmission (hybrid system), or a combination of a fuel cell and an electric motor, for example.

A signal indicative of an accelerator opening AO is input to the driving. ECU 26 from an accelerator opening sensor 36 provided on an accelerator pedal 34 operated by a driver. The driving ECU 26 controls an output of the engine 28 and a gear ratio of the automatic transmission 32 based on an accelerator opening AO, a vehicle speed, and the like, thereby controlling a driving torque of the driving unit 12. Further, the output of the engine 28 and the gear ratio of the automatic transmission 32 are controlled irrespective of the accelerator opening AO, a vehicle speed and the like as necessary. The control unit for controlling the output of the engine 28 and the gear ratio of the automatic transmission 32 may be a control unit different from the driving ECU 26 for controlling the left rear wheel and right rear wheel clutches 24RL and 24RR.

An output gear 38 provided on an output shaft of the automatic transmission 32 meshes with a driven gear 42 of a front wheel differential device 40. A driving torque of the output shaft of the automatic transmission 32 is transmitted to a differential case 44 of the differential device 40. The driving torque transmitted to the differential case 44 is transmitted to the left and right front wheels 16FL and 16FR via the front wheel drive shafts 46FL and 46FR, respectively, b the differential device 40. Therefore, the differential device 40 and the front wheel drive shafts 46FL and 46FR cooperate with each other to form the front wheel driving torque transmission path 18.

A transfer 48 is provided adjacent to the differential device 40. The transfer 48 includes a drive gear 50 integrally connected to the differential case 44 and a driven gear 54 coupled to a front end portion of a propeller shaft 52 and engaged with the drive gear 50 and transmits the driving torque transmitted to the differential case 44 to the propeller shaft 52. A drive gear 56 is coupled to the rear end portion of the propeller shaft 52, and the drive gear 56 meshes with a driven gear 60 provided on a rear wheel drive shaft 58. The left rear wheel clutch 24RL is provided between a drive shaft 62RL that rotates integrally with the left rear wheel 16RL and the rear wheel drive shaft 58. Likewise, the right rear wheel clutch 24RR is provided between a drive shaft 62RR that rotates integrally with the right rear wheel 16RR and the rear wheel drive shaft 58.

The driving torque transmitted to the propeller shaft 52 is transmitted to the left and right rear wheels 16RL and 16RR via the drive gear 56, the driven gear 60, the rear wheel drive shaft 58, the clutches 24RL and 24RL and the drive shafts 62RL and 62RR. Therefore, the differential device 40, the transfer 48, the drive gear 50, the driven gear 54, the propeller shaft 52, the drive gear 56, the driven gear 60, the rear wheel drive shaft 58, the clutches 24RL and 24RR and the drive shafts 62RL and 62RR cooperate with each to form the rear wheel driving torque transmission path 20.

Numbers of the teeth of at least one of the combination of the drive gear 50 and the driven, gear 54 and the combination of the drive gear 56 and the driven gear 60 are set so that a rotational speed of the driven gear is higher than a rotational speed of the drive gear. Therefore, the speed increasing device 22 for increasing the speed of the rear wheels relative to the front wheels is formed by at least one of a combination of these drive gears and driven gears. A speed increasing ratio N of the speed increasing device 22 is a positive constant larger than 1.

The clutches 24RL and 24RR are electromagnetic type clutches, and are configured so that their engaging torques Curl and Curr are changed by controlling the control currents Irl and Irr, respectively, by the driving ECU 26. Therefore, by controlling the engaging torques of the clutches 24RL and 24RR, transmission capacities of the driving torques transmitted from the rear wheel drive shaft 58 to the left and right rear wheels 16RL and 16RR via the drive shafts 62FRL and 62RR, respectively, change.

In the embodiment, when the engagement torques Curl and Curr are zero, the clutches 24RL and 24RR are in the disengaged state, and when the engagement torques Curl and Curr are A (a positive constant), the clutches 24RL and 24RL are in the engaged state. Further, as the engaging torques Curl and Curr increase, the transfer capacities of the driving torques of the clutches 24RL and 24RR increase. The clutches 24RL and 24RR may be hydraulic clutches as long as they can change the engagement state and the transfer capacity of the driving torque by controlling control parameters such as an engagement hydraulic pressure.

The vehicle 14 includes a braking device 70 that independently applies braking forces to the left and right front wheels 16FL and 16FR and the left and right roar wheels 16R and 16RR. The braking device 70 includes a hydraulic circuit 72, wheel cylinders 74FR, 74FL, 74RR and 74RL provided in the wheels 16FL to 16RL, respectively, a master cylinder 78 that feeds a brake oil in pressure in response to a driver's depression operation of a brake pedal 76. Although not shown in detail in FIG. 1, the hydraulic circuit 72 includes a reservoir, an oil pump. various valve devices, and the like, and functions as a brake actuator.

The braking device 70 further includes a pressure sensor 80, which detects a pressure in the master cylinder 78 which is driven in response to depression of the brake pedal 76 by the driver, that is, a master cylinder pressure Pm. Pressure in the wheel cylinders 74FL to 74RR are controlled according to the master cylinder pressure Pm in a normal state. Further, the oil pump and various valve devices are controlled as needed by an electronic control unit 82 for braking, so that the pressures in the wheel cylinders 74FL to 74RR are controlled irrespective of the amount of depression of the brake pedal 76. Therefore, the braking device 70 can independently control the braking forces of the wheels 16FL to 16RL. In the following description and in FIGS. 1 and 6, the "electronic control device for braking" is denoted as "braking ECU".

Although not shown in detail in FIG. 1, both the driving ECU 26 and the braking ECU 82 include a microcomputer and a driving circuit, and exchanges necessary information mutually via CAN, for example. Each microcomputer has a general configuration in which a CPU, a ROM, a RAM, and an input/output port device are mutually connected by a bidirectional common bus.

A signal indicating a steering angle θ is input to the driving ECU 26 from a steering angle sensor 84. The steering angle θ is 0 when the vehicle 14 travels straight and takes positive and negative values when the vehicle turns right and left, respectively. The ROM of the microcomputer of the driving ECU 26 stores a clutch control program corresponding to the flowchart shown in FIG. 2 described later and the map shown in FIG. 3. The CPU of the driving ECU 26 controls engaging torques of the clutches 24RL and 24RR by executing the clutch control program.

Wheel speeds Vwi (i=fl, fr, rl and rr) of the wheels 16FL to 16RR are input from wheel speed sensors 86i (i=fl, fr, rl and rr) provided for the wheels 16FL to 16RR to the braking ECU 82. Although a flowchart of the braking control is not shown, the braking ECU 82 controls a braking force of each wheel according to an amount of braking operation by the driver. In particular, the braking ECU 82 performs antiskid control (hereinafter referred to as "ABS control") in a manner known in the art. That is, the braking ECU 82 calculates braking slip ratios of the wheels 16FL to 16RR based on the wheel speeds Vwi, and, when a braking slip ratio of any of the wheels exceeds a control start reference value, controls a braking force of the wheel such that the braking slip ratio of the wheel becomes a value within a predetermined range until a control termination condition set in advance is satisfied.

Control of Clutch Engagement and Disengagement

Figure 2:
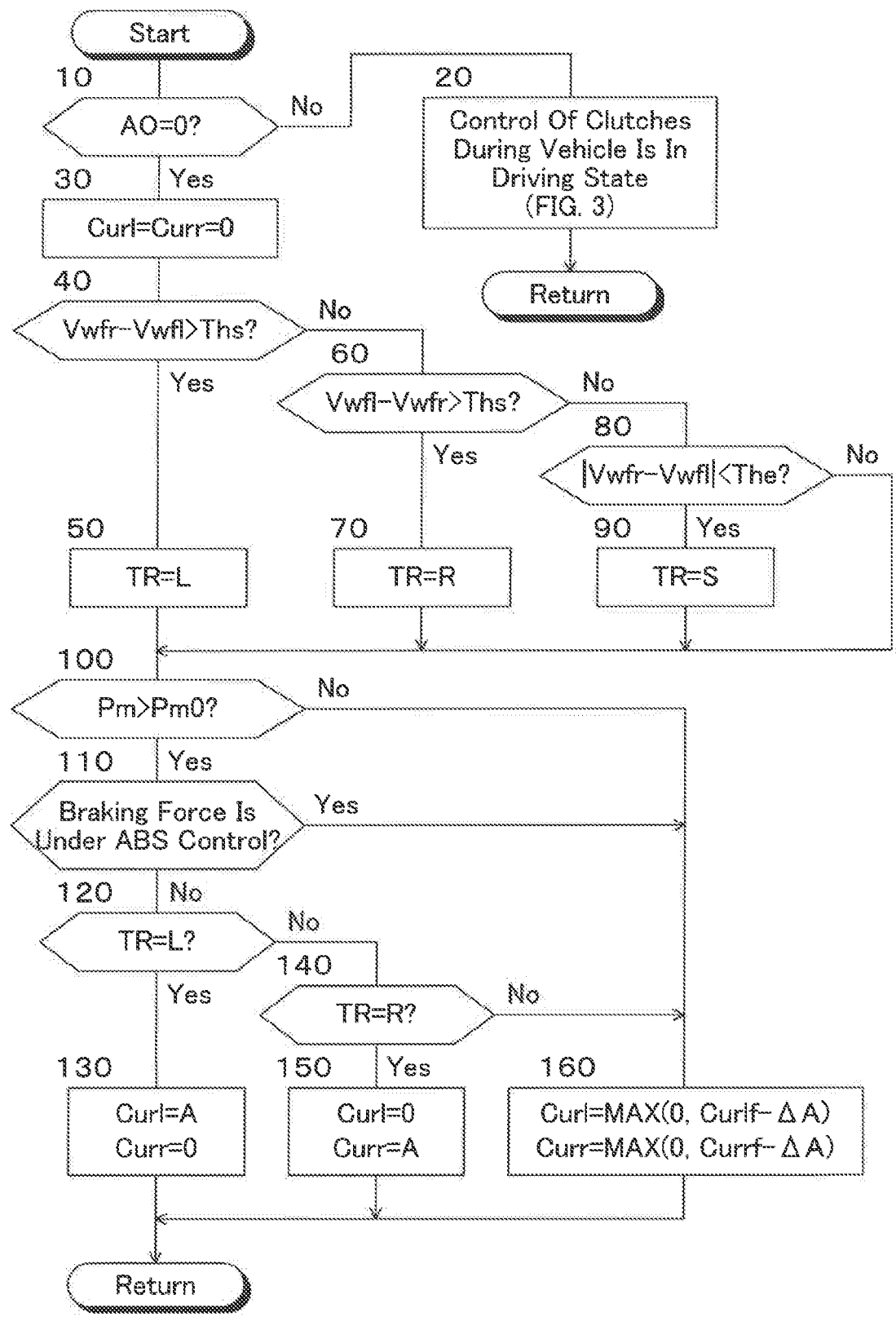
FIG. 2 is a flow chart showing a control routine of engagement and disengagement of clutches in the first embodiment.

Next, a control routine for engaging and disengaging the clutches 24RL and 24RR in the first embodiment will be described with reference to the flowchart shown in FIG. 2. In the following description, control of engagement and disengagement of the clutches is simply referred to as "the control". The control according to the flowchart shown in FIG. 2 is repeatedly performed at predetermined time intervals when an ignition switch not shown is ON.

First, in step 10, a determination is made as to whether or not the vehicle is in the non-driving state by determining whether or not an accelerator opening AO detected by the accelerator opening sensor 36 is zero. When an affirmative determination is made, the control proceeds to step 30, and when a negative determination is made, the control proceeds to step 20.

Figure 3:
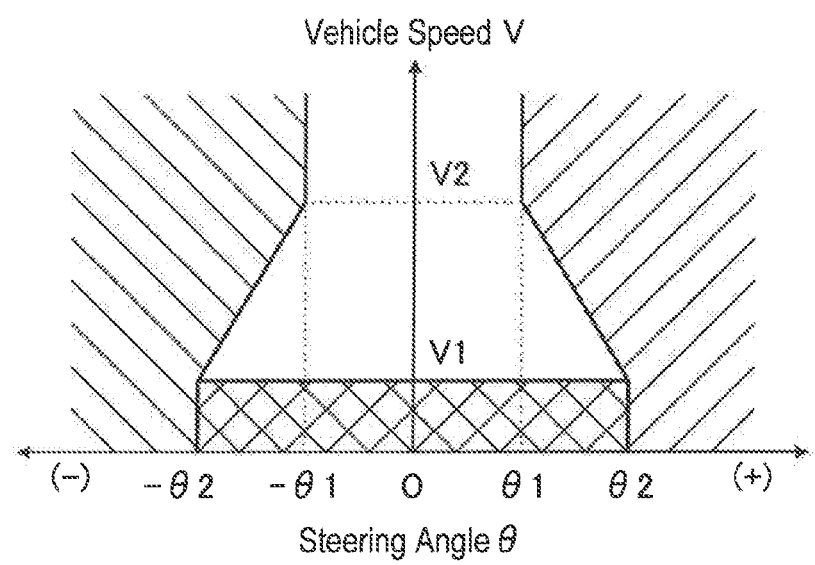
FIG. 3 is a map for determining engagement and disengagement of the clutches for rear left and right rear wheels based on a vehicle speed V and a steering angle θ.

In step 20, control of engagement and disengagement of the clutches 24RL and 24RR for the period when the vehicle is in a driving state is performed. Specifically, a vehicle s peed V is calculated in a manner known in the art based on wheel speeds Vwi, and the map shown in FIG. 3 is referred to based on a vehicle speed V and a steering angle θ. The engagement and disengagement (release) of 24RL and 24RR are determined, and the engagement and disengagement of clutches 24RL and 24RR are controlled in accordance with the determination result.

In FIG. 3, the cross hatched area is an area where the clutches 24RL and 24RR are engaged. The area of the lower left hatching is an area where the clutch 24RL is engaged and the clutch 24RR is disengaged, and the area of the lower right hatching is an area where the clutch 24RR is engaged and the clutch 24RL is disengaged, and the non-hatched area is an area where the clutches 24RL and 24RR are disengaged.

In step 30, the clutches 24RL and 24RR are disengaged by controlling. the engaging torques Curl and Curr to zero.

In step 40, a reference value Ths for determining oversteer state is calculated based on a vehicle speed V such that the reference value becomes a larger positive value as the vehicle speed V increases. Further, a determination is made as to whether or not the vehicle is in a left turn oversteer state by determining whether or not a difference Vwfr−Vwfl between a wheel speed Vwfr of the right front wheel 16FR and a wheel speed Vwfl of the left front wheel 16FL is larger than the reference value Ths. When a negative determination is made, the control proceeds to step 60, and when an affirmative determination is made, a turning direction flag TR is set to L indicating the left turn oversteer state in step 50, and then the control proceeds to step 100.

In step 60, the reference value Ths for turning determination is calculated based on a vehicle speed V such that the reference value becomes a larger positive value as the vehicle speed V increases. Further, a determination is made as to whether or not the vehicle is in a right turn oversteer state by determining whether or not a difference Vwfl−Vwfr between a wheel speed Vwfl of the left front wheel 16FL and a wheel speed Vwfr of the right front wheel 16FR is larger than the reference value Ths. When a negative determination is made, the control proceeds to step 80, and when an affirmative determination is made, the turning direction flag TR is set to R indicating the right turn oversteer state in step 70, and thereafter the control proceeds to step 100. In steps 40 and 60, the reference value Ths may be a positive constant.

In step 80, a reference value The for determining oversteer state end is calculated based on a vehicle speed V such that the reference value becomes a larger positive value as the vehicle speed V increases. Further, a determination is made as to whether or not a difference Vwfr−Vwfl between a wheel speed Vwfr of the right front wheel 16FR and a wheel speed Vsfl of the left front wheel 16FL is smaller than the reference value The. When a negative determination is made, the control proceeds directly to step 100. When an affirmative determination is made, the turning direction flag TR is set to S indicating a non-oversteer state in step 90, and then the control proceeds to step 100.

In step 100, a determination is made as to whether or not the vehicle is in a braking state by determining whether or not a master cylinder pressure Pm is larger than a reference value Pm0 (a positive constant) for braking determination, When a negative determination is made, the control proceeds to step 160, and when an affirmative determination is made, the control proceeds to step 110.

In step 110, a determination is made as to whether or not any wheel is in the braking force control by the ABS control. When an affirmative determination is made, the control proceeds to step 160, and when a negative determination is made, the control proceeds to step 120.

In step 120, a determination is made as to whether or not the turning direction flag TR is L, that is, whether the vehicle is in the left turn oversteer state. When a negative determination is made, the control proceeds to step 140, When an affirmative determination is made, in step 130, the engaging torques Curl and Curr of the clutches 24RL and 24RR are controlled to A and zero, respectively, whereby the clutch 24RL on the inside of the turn is engaged and the clutch 24RR on the outside of the turn is disengaged.

In step 140, a determination is made as to whether the turning direction flag TR is R, that is, whether the vehicle is in the right turn oversteer state. When a negative determination is made, the control proceeds to step 160. When an affirmative determination is made, in step 150, the engaging torques Curl and Curr of the clutches 24RL and 24RR are control led to zero and A, respectively, so that the clutch 24RL on the outside of turning is disengaged and the clutch 24RRL on the inside of turning is engaged.

In step 160, engaging torques of the clutches 24RL and 24RR are controlled to become target engaging torque Curl and Curr calculated according to the following equations (1) and (2), respectively. In Equations (1) and (2), MAX means selecting the larger one of the two values in parentheses. Curlf and Currf mean previous values of the target engaging torques Curl and Curr, respectively, and ΔA is a positive constant of about several tens of A, for example.

$$Curl = MAX(0, Curlf - \Delta A) \quad (1)$$

$$Curr = MAX(0, Currf - \Delta A) \quad (2)$$

Next, the operation of the behavior control apparatus 10 according to the first embodiment will be described for various situations in which the vehicle is turning.

When the Vehicle is in Oversteer State During Turning Under Braking

When the vehicle is in oversteer state during left turn under braking, affirmative determinations are made in steps 10 and 40, and affirmative determinations are made in steps 100 and 120. Furthermore, in step 130, the left rear wheel clutch 24RL, that is, the clutch inside the turning is engaged, and the right rear wheel clutch 24RR is disengaged.

When the vehicle is in oversteer state during right turn under braking, an affirmative determination is made in step 10, a negative determination is made in step 40, and an affirmative determination is made in step 60. An affirmative determination is made in step 100 and a negative determination is made in step 120. Further, an affirmative determination is made in step 140, and in step 150, the left rear wheel clutch 24RL is disengaged and the right rear wheel clutch 24RR, that is, the clutch inside the turning is engaged.

When the vehicle becomes out of oversteer state in the situation where the clutch inside the turning is engaged, and an affirmative determination is made in step 80, step 160 is executed, whereby the engaging torque of the engaged clutch is gradually reduced and finally the clutch is disengaged.

Further, even when the vehicle is in the turning under braking and in oversteer state, when the control of a braking force by the ABS control is performed for any of the wheels, an affirmative determination is made in step 110. Thus, step 160 is performed, so that the clutch on the inside of the turn is disengaged without being engaged.

When the Vehicle is Turning Under Braking but is not in Oversteer State

When the vehicle is braking and Liming to the left under braking while it is not in an oversteer state, an affirmative determination is made in step 10 and negative determinations are made in steps 40 and 60, Further, an affirmative determination is made in step 100, negative determinations are made in steps 120 and 130, and the left rear wheel clutch 24RL and the right rear wheel clutch 24RR are disengaged in step 160. Therefore, the clutch on the turning inner rear wheel side is not engaged.

When the Vehicle is in Oversteer State but is not in Braking or Driving

When the vehicle is in oversteer state but is not in braking or driving, an affirmative determination is made in step 10, and an affirmative determination is made in step 40 or 60. However, a negative determination is made in step 100, so that the clutch 24RL for the rear left wheel and the clutch 24RR for the rear right wheel are disengaged in step 160.

When the Vehicle is Turning but Under Driving

When the vehicle is turning but driving, a negative determination is made in step 10 and step 20 is executed. Therefore, in a situation where the vehicle starts and accelerates while turning, the left and right clutches 24RL and 24RR are engaged to ensure start acceleration performance of the vehicle. Further, in a case of turning where an absolute value of the steering angle θ is large, the clutch for the turning outer rear wheel is engaged, and a yaw moment in the turning assisting direction is applied to the vehicle 14 to ensure good turning performance of the vehicle.

Mechanism in which Driving Force is Applied to the Turning Inner Rear Wheel by the Engagement of the Turning Inner Clutch As described above, according to the first embodiment, when the vehicle is in oversteer during turning under braking, the clutch inside the turning is engaged and the clutch outside the turning is disengaged. A mechanism will be described in which a driving force is applied to the turning inner rear wheel when the turning inner clutch is engaged during turning under braking of the vehicle.

Figure 4:
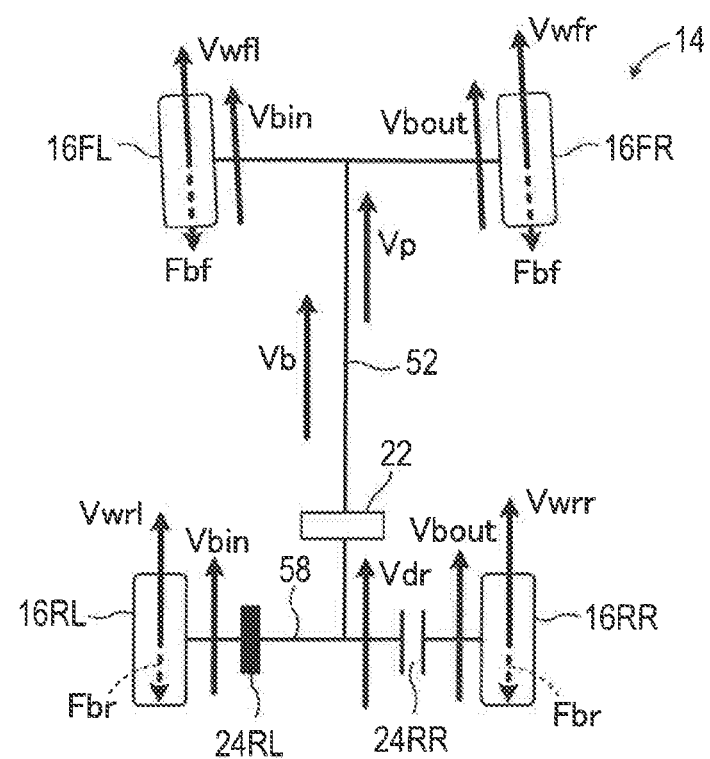
FIG. 4 is a view for explaining a mechanism capable of applying a driving force to a turning inner rear wheel by engaging the clutch for a turning inner rear wheel when the four-wheel drive vehicle is in a turning state under braking.

As shown in FIG. 4, a case is considered where slow braking is performed in a situation where the vehicle 14 is turning left at a vehicle speed Vb of 100 km/h (=vehicle speed V).

It is assumed that due to a difference in turning radius, a vehicle speed Vbin at the positions of the turning inner wheels is 1 km/h lower than the vehicle speed Vb, and a vehicle speed Vbout at the positions of the turning outer wheels is 1 km/h higher than the vehicle speed Vb. Further, since a braking force distribution ratio of the front wheels is larger than a braking force distribution ratio of the rear wheels and a braking force Fbf of the front wheels is higher than a braking force Fbr of the rear wheels, it is assumed that the wheel speeds Vwfl and Vwfr of the front wheels are 2 km/h lower than the vehicle speed Vb, and the wheel speeds Vwrl and Vwrr of the rear wheels are 1 km/h, lower than the vehicle speed Vb. The wheel speeds are wheel circumferential speeds.

The wheel speed Vwfl of the left front wheel, which is the turning inner front heel, is 100−1−2=97 km/h, and the wheel speed Vwfr of the right front wheel, which is the turning outer front wheel, is 100+1−2=99 km/h. The wheel speed Vwrl of the left rear wheel which is the inner turning rear wheel is 100−1−1=98 km/h, and the wheel speed Vwrr of the right rear wheel which is the turning outer rear wheel is 100+1−1=100 km/h.

It is assumed that speed increasing of the speed increasing device 22 is achieved only by the combination of the drive gear 56 and the driven gear 60, and the speed increasing rate is 3%. A vehicle speed converted value Vp of the rotational speed of the propeller shaft 52 is an average value 98 km/h of wheel speeds Vwfl and Vwfr of the left front wheel and the right front wheel, and a vehicle speed converted value Vdr of a rotational speed of the rear wheel drive shaft 58 is 98×1.03≈101 km/h.

When an increase in the engagement torque of the clutch 24RL inside the turning is started, an acceleration torque is transmitted from a vehicle body side clutch plate having a rotational speed equivalent to a vehicle speed of 101 km/h to a wheel side clutch plate having a rotational speed equivalent to a vehicle speed of 98 km/h. Thus, a driving force by the acceleration torque is applied to the left rear wheel 16RL. As a result, when the driving force overcomes a braking force, the wheel speed Vwrl of the left rear wheel rises from 98 km/h which is lower than the vehicle speed Vbin=99 km/h at the position of the left rear wheel to 101 km/h, and becomes higher than the vehicle body speed Vbin.

The above-mentioned acceleration of the left rear wheel 16RL is achieved by a driving force that the front wheels 16FL and 16FR receive from a road surface as reaction forces of the braking forces being transmitted to the left rear wheel through the front wheel driving torque transmission path 18 and the rear wheel driving torque transmission path 20. Therefore, a driving force acts on the left rear wheel in a situation where braking forces are applied to the wheels, so that the braking force on the left rear wheel decreases, and further, a longitudinal force of the left rear wheel becomes a driving force. As a result, an anti-spin moment acts on the vehicle 14 due to a difference in longitudinal forces between the left and right rear wheels, so that the over-steer state of the vehicle 14 can be reduced without increasing or decreasing the braking forces of the left and right wheels.

It is to be noted that when the vehicle is in right turn under braking, the right wheels are the turning inner wheels and the left wheels are the turning outer wheels, so that when the turning inner clutch 24RR is engaged, a driving force is applied to the right rear wheel 16RR which is the turning inner rear wheel.

As will be understood from the above description, the behavior control device 10 according to the present disclosure is applied to a four-wheel drive vehicle in which a wheel speed of the turning inner rear wheel becomes higher than a vehicle speed at the position of the turning inner rear wheel when the inner clutch is engaged while the vehicle is turning under braking. That is, the behavior control apparatus 10 of the present disclosure is applied to a four-wheel drive vehicle in which the speed increasing ratio N of the speed increasing device 22 and the front and rear wheel distribution ratio of braking forces of the braking device 70 are set such that a wheel speed of the inner rear wheel becomes higher than a vehicle speed at the inner rear wheel position.

Specific Example of Operation

Figure 5:
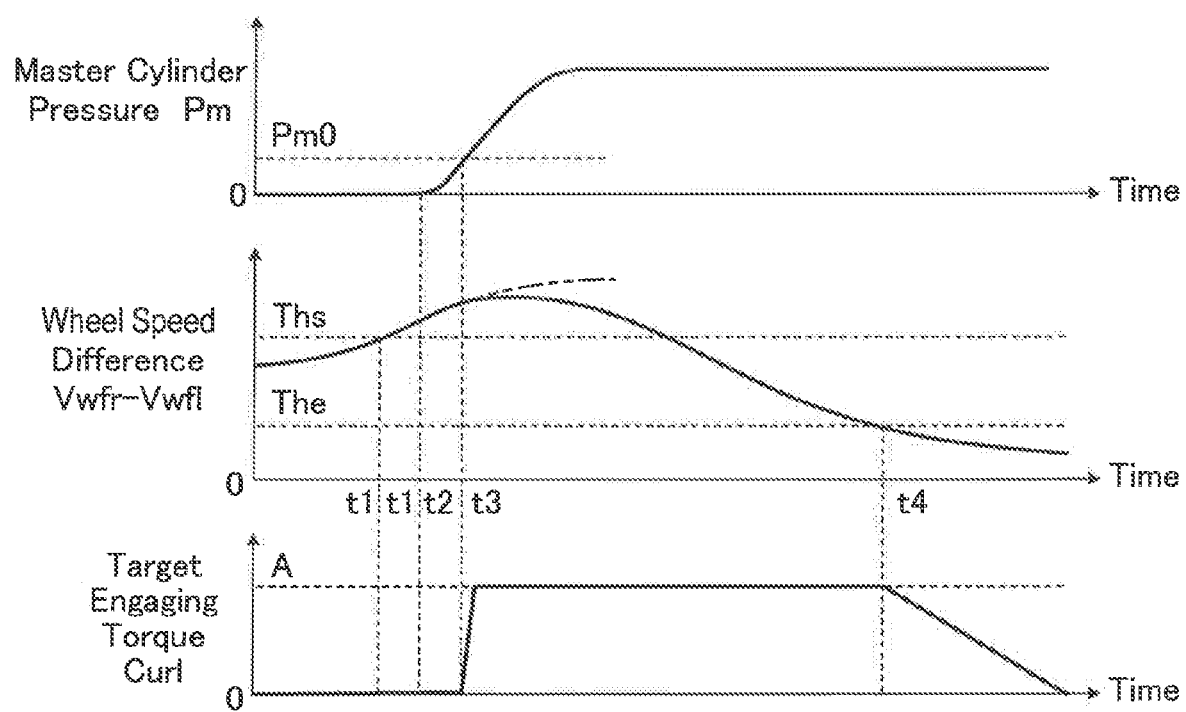
FIG. 5 is a time chart showing operation of the first embodiment for a case where braking is performed during left turn and the vehicle is in oversteer state.

FIG. 5 is a time chart showing an operation of the first embodiment when braking is performed during turning left and the vehicle becomes in oversteer state.

It is assumed that at time point t1, a wheel speed difference Vwfr−Vwfl exceeds the reference value Ths of oversteer state determination, and at time point t4, the wheel speed difference Vwfr−Vwfl becomes smaller than the reference value The of oversteer state end determination. Further, it is assumed that braking operation is started at time point t2, and a master cylinder pressure Pm exceeds the reference value Pm0 for braking determination at time point t3.

The determination in step 40 becomes affirmative after time point t1, and the determination in step 100 becomes affirmative after time point t3, and step 130 is executed. At time point t3, the engaging torque Curl of the clutch 24RL is increased to A, and immediately thereafter, the clutch 24RL is engaged. Further, after time point t4, the determination in step 80 becomes affirmative and the step 160 is executed, and the engaging torque Curl of the clutch 24RL is gradually reduced until the engaging torque becomes zero.

As a result, the clutch 24RL is engaged from immediately after time point t3 to time point t4, so that a driving force is applied to the left rear wheel 16RL, and an anti-spin moment is applied to the vehicle 14. Therefore, the wheel speed difference Vwfr−Vwfl decreases without increasing as shown by the phantom line, and oversteer state of the vehicle is eliminated.

Second Embodiment

Figure 6:
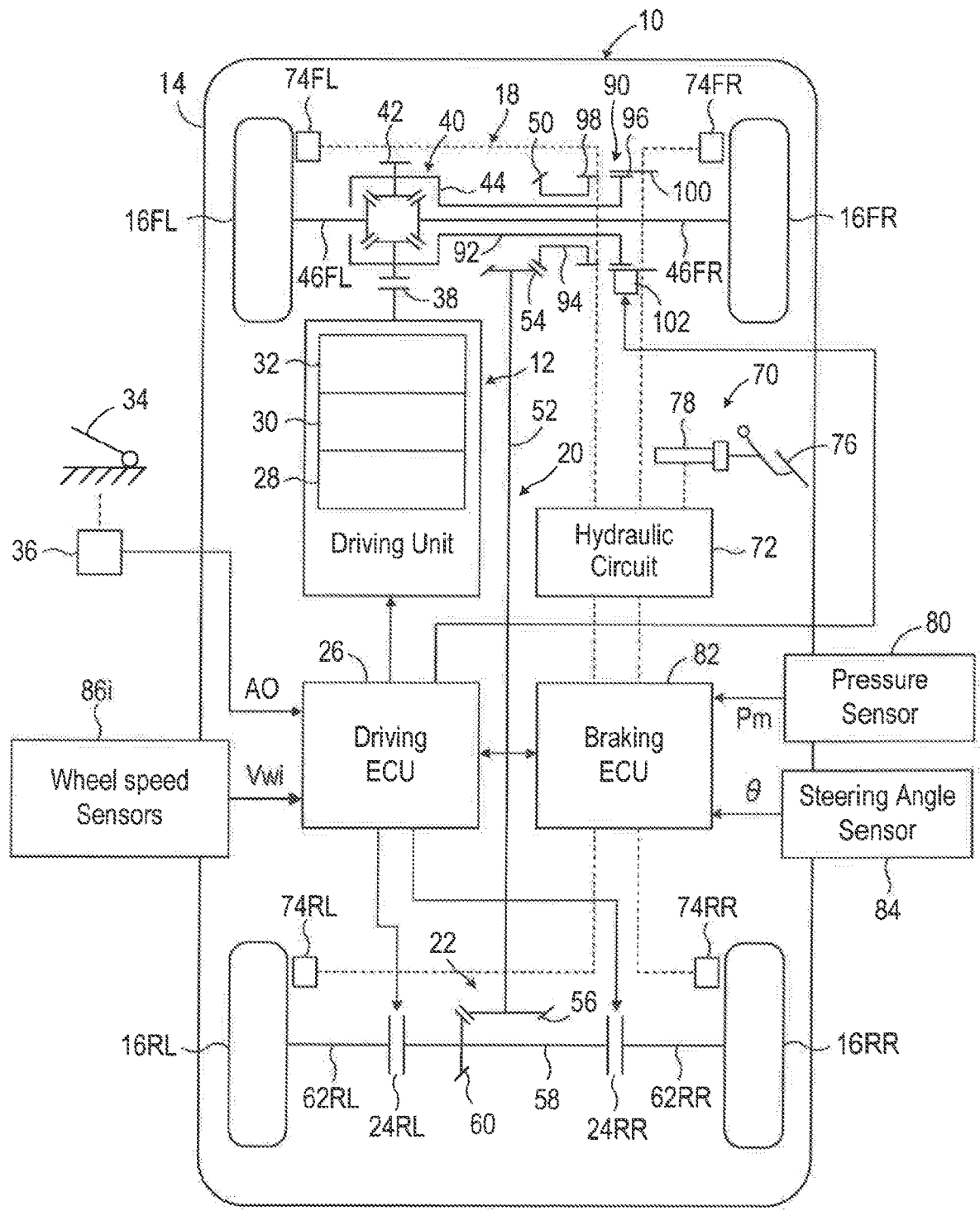
FIG. 6 is a schematic configuration view showing a second embodiment of a behavior control apparatus for a four-wheel drive vehicle according to the present disclosure.

FIG. 6 is a schematic block diagram showing a second embodiment of the behavior control apparatus for a vehicle according to the present disclosure. In FIG. 6, the same members as those shown in FIG. 1 are given the same reference numerals as the reference numerals in FIG. 1.

In this embodiment, a connecting/disconnecting device 90 is provided in the rear wheel driving torque transmission path 20. The connecting/disconnecting device is configured to connect and disconnect the rear wheel driving torque transmission path 20 on the side of the driving unit 12 with respect to the speed increasing device 22 by being controlled by the driving ECU 26. The connecting/disconnecting device 90 includes clutch teeth 96 and 98 provided at one ends of cylindrical first and second rotating members 92 and 94 coaxially fitted with each other, and a sleeve 100 having internal teeth (not shown) that can engage with the clutch teeth.

The front wheel drive shaft 46FR extends through the first rotating member 92, and the first rotating member 92 is integrally connected to the differential case 44 of the differential device 40 at the other end. The other end of the second rotating member 94 is provided with the drive gear 50 engaged with the driven gear 54. The sleeve 100 is driven by an actuator 102 between a meshing position in which the internal teeth mesh with the clutch teeth 96 and 98 and a non-meshing position in which the internal teeth mesh with the clutch teeth 96 but the meshing between the internal teeth and the clutch teeth 98 is disengaged. The actuator 102 is controlled by the driving ECU 26.

Thus, the connecting/disconnecting device 90 is a dog clutch (i.e., a meshing clutch) that performs drive connection and disconnection between the first and second rotating members 92 and 94. The connecting/disconnecting device 90 may be provided with a synchronization mechanism.

The ROM of the driving ECU 26 stores a control program of the engaging torque of the clutches 24RL and 24RR, which is executed according to the flowchart shown in FIG. 2. Thus, the control of the engaging torques of the clutches 24RL and 24RR is performed in the same manner as the control of the engagement torques of the clutches 24RL and 24RR in the first embodiment according to the flowchart shown in FIG. 2. Further, the ROM of the driving ECU 26 stores a connecting/disconnecting control program of the connecting/disconnecting device 90 which is executed according to the flowchart shown in FIG. 7.

Figure 7:
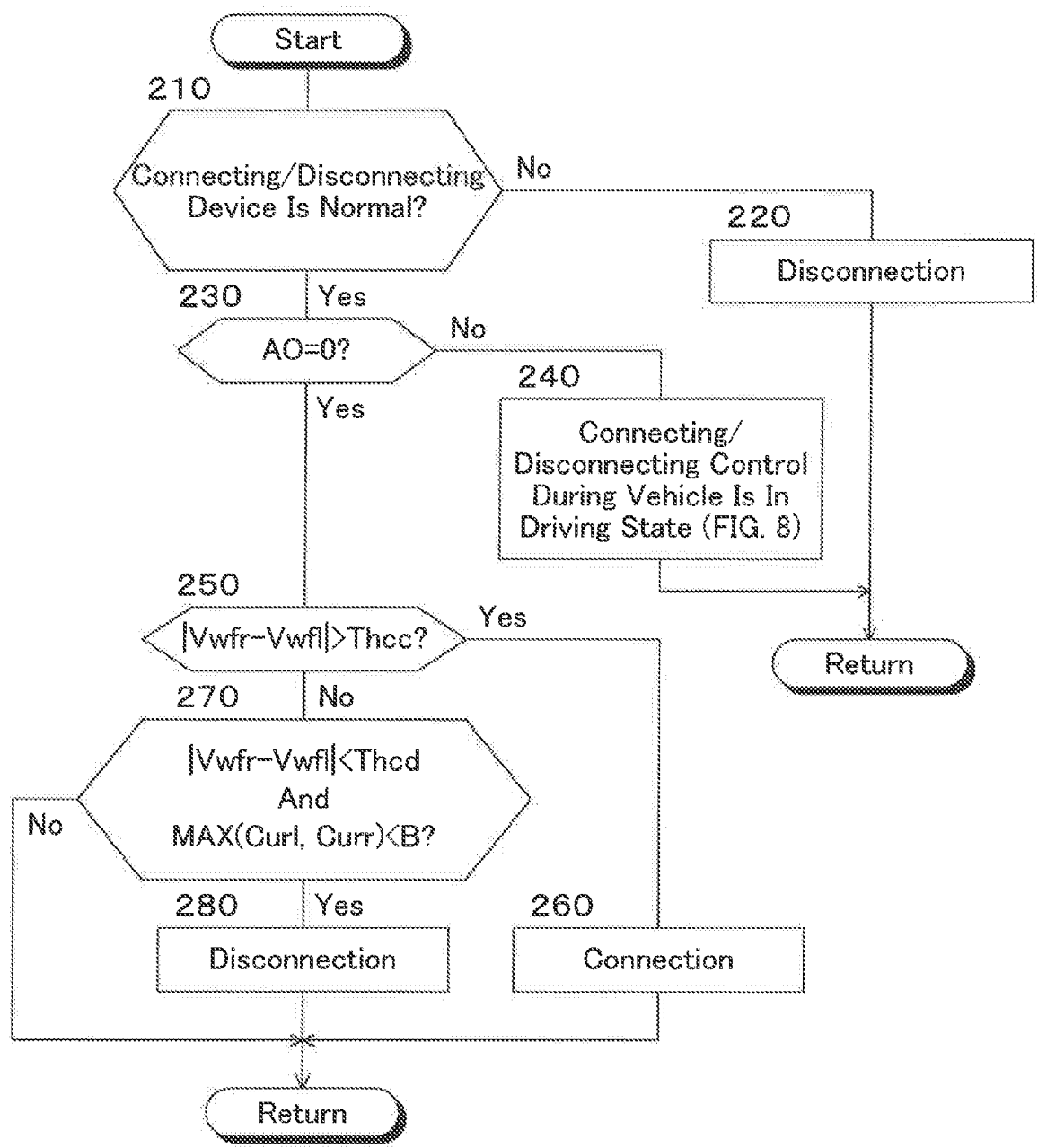
FIG. 7 is a flow chart showing a connecting and disconnecting control routine of the connecting/disconnecting device in the second embodiment.

Next, the connecting/disconnecting control routine of the connecting/disconnecting device 90 will be described with reference to the flowchart shown in FIG. 7. In the following description, the connecting/disconnecting control of the connecting/disconnecting device 90 is simply referred to as "the connecting/disconnecting control". Notably, the connecting/disconnecting control according to the flowchart shown in FIG. 7 is repeatedly performed at predetermined time intervals when the ignition switch not shown is ON.

First, in step 210, a determination is made as to whether or not the connecting/disconnecting device 90 is normal. When an affirmative determination is made, the connecting/disconnecting control proceeds to step 230, and when a negative determination is made, the connecting/disconnecting device 90 is disconnected in step 220.

In step 230, a determination is made as to whether or not the vehicle is in the non-driving state by determining whether an accelerator opening AO detected by the accelerator opening sensor 36 is zero. When an affirmative determination is made, the connecting disconnecting control proceeds to step 250, and when a negative determination is made, the connecting/disconnecting control proceeds to step 240.

Figure 8:
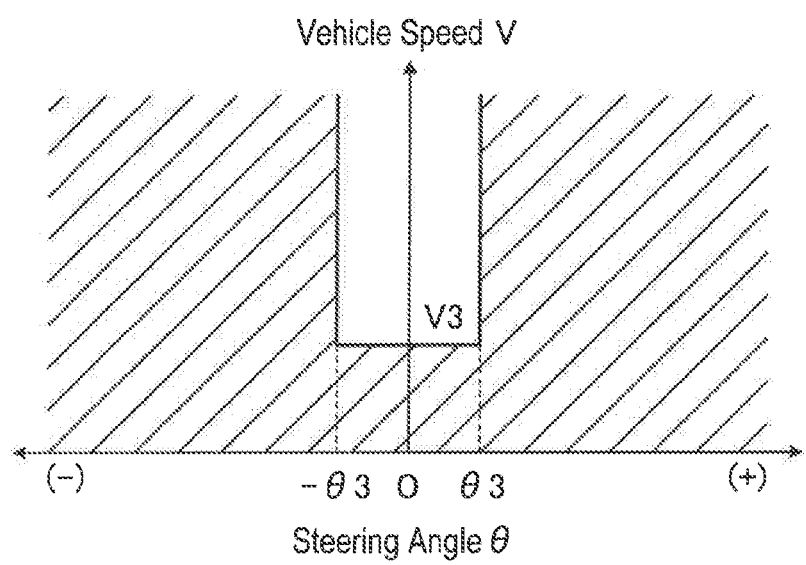
FIG. 8 is a map for determining connecting and disconnecting of the connecting/disconnecting device based on a vehicle speed V and a steering angle θ.

In step 240, connecting/disconnecting control of the connecting/disconnecting device 90 when the vehicle is in a driving state is performed. Specifically, a vehicle speed V is calculated based on wheel speeds Vwi in a manner known in the art, and the map shown in FIG. 8 is referred to based on the vehicle speed V and a steering angle θ. The connection or disconnection of the connecting/disconnecting device 90 is determined, and the connection or disconnection of the connecting/disconnecting device is controlled according to the determination result. In FIG. 8, the hatched area is an area where the connecting/disconnecting device 90 is connected, and the non-hatched area is an area where the connecting/disconnecting device 90 is disconnected.

In step 250 a reference value Thcc for turning determination is calculated based on the vehicle speed V such that the reference value becomes a larger positive value as the vehicle speed V increases. Further, a determination is made as to whether or not the vehicle is in oversteer state based on whether or not an absolute value of a difference Vwfr−Vwfl between the wheel speed Vwfr of the right front wheel 16F and the wheel speed Vwfl of the left front wheel 16FL is larger than the reference value Thcc. When a negative determination is made, the connecting/disconnecting control proceeds to step 270, and when an affirmative determination is made, the connecting/disconnecting device 90 is connected in step 260.

In step 270, a reference value Thcd for determining the end of turning is calculated based on the vehicle speed V such that the reference value becomes a larger positive value as the vehicle speed V increases. Further, a determination is made as to whether or not an absolute value of the difference Vwfr−Vwfl between the wheel speed Vwfr of the right front wheel 16FR and the wheel speed Vwfl of the left front wheel 16FL is smaller than the reference value Thcd and whether or not the larger one of the engaging torques Curl and Curr of the clutches 24RL and 24RR is smaller than a reference value B (a positive constant smaller than A). When a negative determination is made, the connecting/disconnecting control ends once, and when an affirmative determination is made, the connecting/disconnecting device 90 is disconnected in step 280.

As understood from the above description, in the second embodiment, the rear wheel driving torque transmission path 20 is provided with the connecting/disconnecting device 90 on a side closer to the driving unit 12 than the speed increasing device 22. Connection and disconnection of the connecting/disconnecting device 90 are controlled by the driving ECU 26 according to the flowchart shown in FIG. 7.

In a conventional our-wheel drive vehicle provided with a connecting/disconnecting device similar to the connecting/disconnecting device 90, the connecting/disconnecting device disconnects the rear wheel driving torque transmission path when the vehicle is not driven. Therefore, even when the vehicle becomes in oversteer state during turning under braking and the clutch inside the turning is engaged, it is not possible to apply a driving force to the turning inner rear wheel in the same manner as in the first embodiment.

On the other hand, according to the second embodiment, when the vehicle 14 is in the non-driven state and becomes in oversteer state, affirmative determinations are made in steps 230 and 250, and the connecting/disconnecting device 90 is connected in step 260. Therefore, when the vehicle 14 is in oversteer state during tuning under braking and the clutch 24RL or 24RR on the turning inner side is engaged, a driving force can be applied to the turning inner rear wheel 16RL or 16RR in the same manner as in the first embodiment in which the connecting/disconnecting device is not provided.

It is to be noted that even if the degree of oversteer state of the vehicle 14 decreases, the connecting/disconnecting device 90 is not disconnected unless the determination in step 270 is an affirmative determination, so that the connecting/disconnecting device is not disconnected before the clutch 24RL or 24RR on the turning inside is disconnected.

In particular, according to the second embodiment, the connecting/disconnecting device 90 can be connected before the clutch 24RI or 24RR on the turning inside is engaged, and the connecting/disconnecting device 90 can be disconnected after the clutch on the turning inside is disconnected. Therefore, it is possible to reliably prevent that a driving force cannot be applied to a turning inner rear wheel despite engaging the turning inner clutch.

Specific Example of Operation

Figure 9:
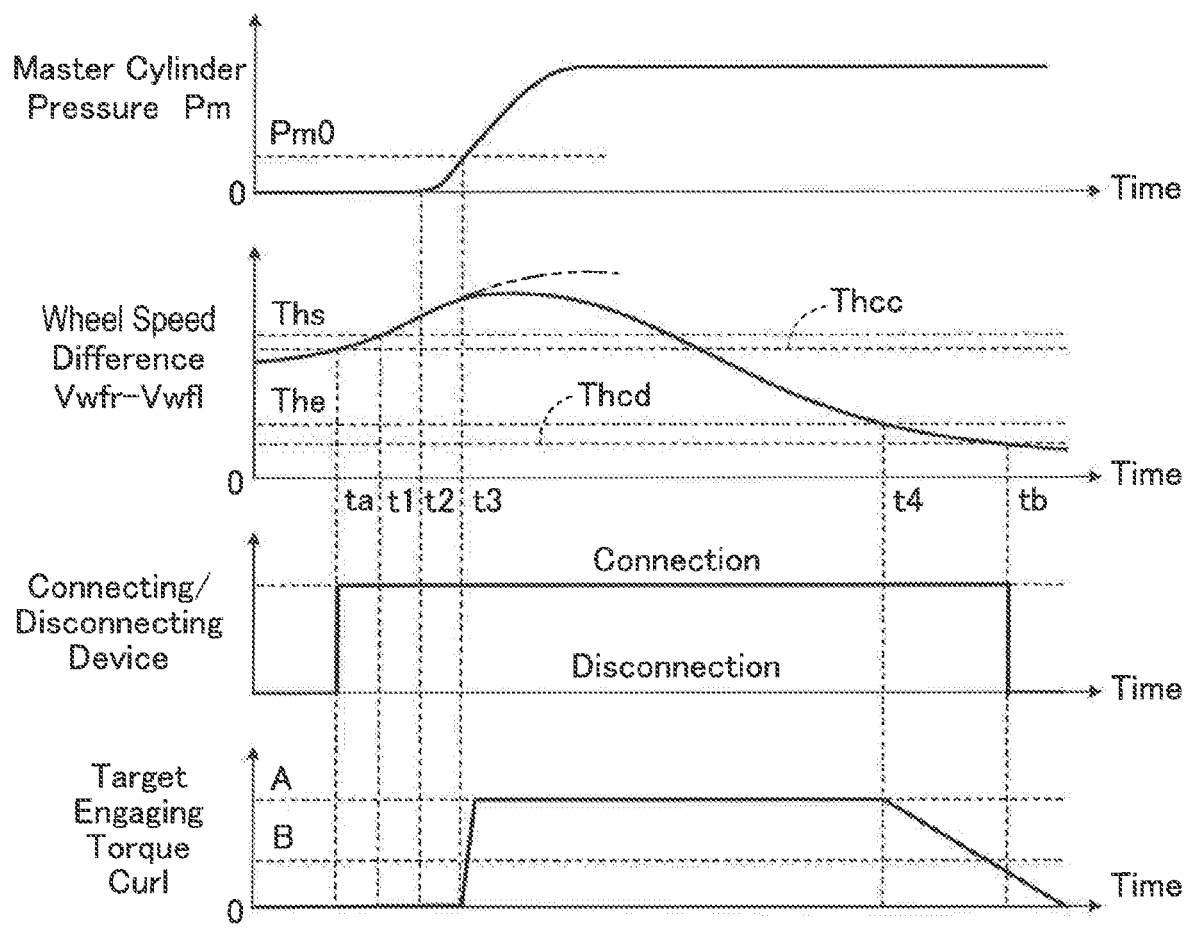
FIG. 9 is a time chart showing operation of the second embodiment for a case where braking is performed during left turn and the vehicle is in oversteer state.

FIG. 9 is a time chart showing an operation of the second embodiment in the case where braking is performed during left turn and the vehicle becomes oversteer. The meaning of time point t1 to time point t4 is the same as in FIG. 5 described above.

It is assumed that at time point t1, a wheel speed difference Vwfr−Vwfl exceeds the reference value Ths of oversteer state determination, and at time point t4, the wheel speed difference Vwfr−Vwfl becomes smaller than the reference value The of oversteer state end determination. It is also assumed that the wheel speed difference Vwfr−Vwfl exceeds the reference value Thcc at a lime point ta earlier than the time point t1, and at a time point tb later than at the time point 14, the wheel speed difference Vwfr−Vwfl becomes smaller than the reference value Thcd. it is further assumed that braking operation is started at time point t2, and a master cylinder pressure Pm exceeds the reference value Pm0 for braking determination at time point t3.

At time point ta, the connecting/disconnecting device 90 is switched from disconnected state to connected state, and the determination in step 40 becomes affirmative after time point t1, and the determination in step 100 becomes affirmative after time point t3, and step 130 is executed. At time point 13, the engaging torque Curl of the clutch 24RL is increased to A, and immediately thereafter, the clutch 24RL is engaged. After time point t4, the determination in step 80 becomes affirmative and the step 160 is executed, and the engaging torque Curl of the clutch 24RL is gradually reduced until the engaging torque becomes zero. Further, the connecting/disconnecting device 90 is switched from connected state to disconnected state at time point tb later than time point t4.

As a result, the clutch 24RL is connected from immediately after time point t3 to time point t4, so that a driving force is applied to the left rear wheel 16RL, and an anti-spin moment is applied to the vehicle 14. Therefore, the wheel speed difference Vwfr−Vwfl decreases without increasing as shown by the phantom line, and oversteer state of the vehicle is eliminated.

Third Embodiment

Figure 10:
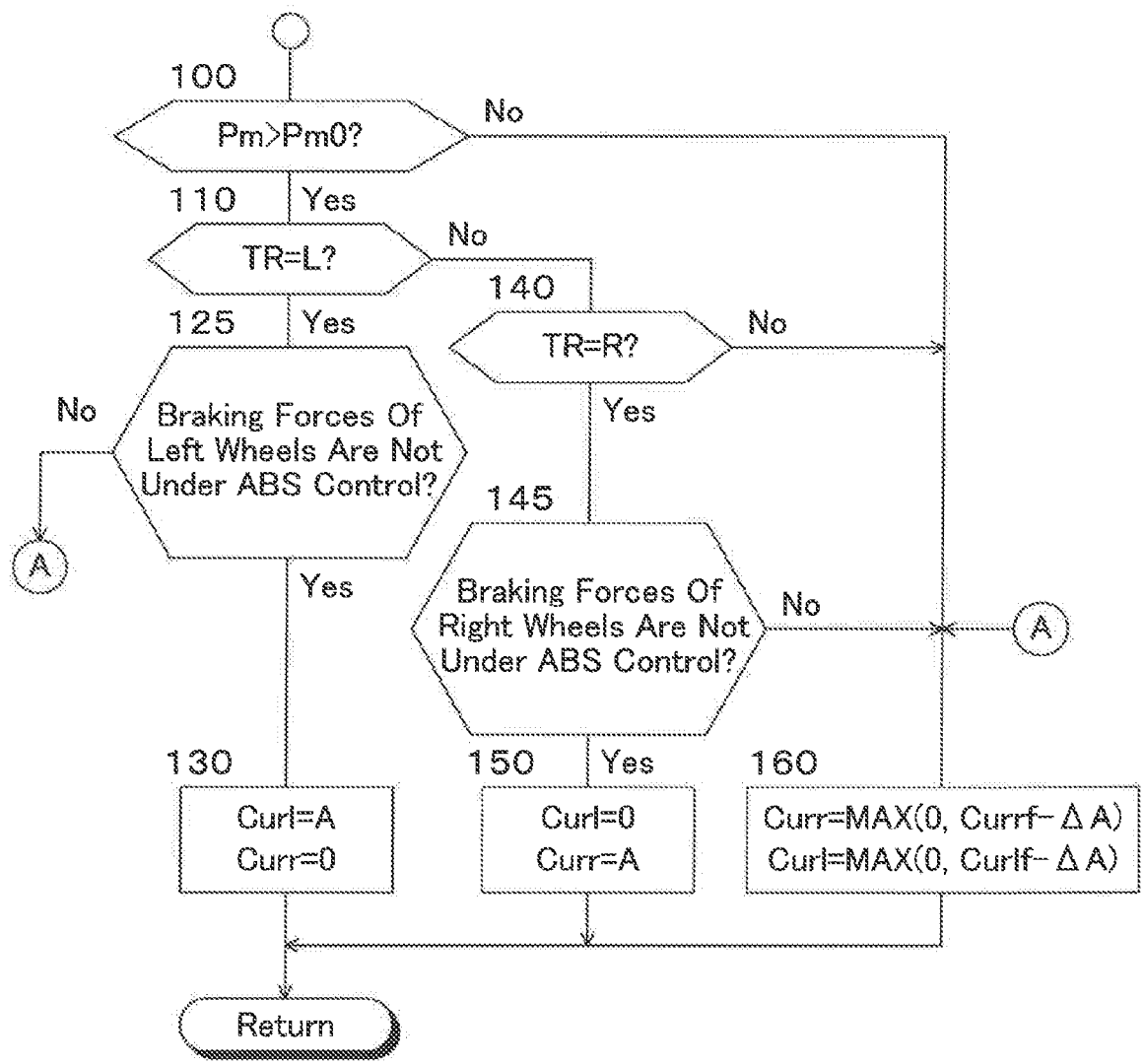
FIG. 10 is a flow chart showing the second half of the clutch engagement and disengagement control routine in the third embodiment of the behavior control apparatus for a four-wheel drive vehicle according to the present disclosure.

FIG. 10 is a flowchart showing the second half of the control routine of the engaging torque of the clutches 24RL and 24RR in the third embodiment of the behavior control apparatus according to the present disclosure. In FIG. 10, the same steps as the steps shown in FIG. 2 are assigned the same step numbers as the step numbers assigned in FIG. 2.

In the third embodiment, steps 10 to 110 and steps 130, 140, 150 and 160 are performed as in the first embodiment. However, when affirmative determinations are made in steps 110 and 140, the control of the engaging torque proceeds to steps 125 and 145, respectively, In step 125, a determination is made as to whether or not both the front left wheel 16FL and the rear left wheel 16RL are not under the braking force control by the ABS control. When a negative determination is made, that is, when the braking force control by the ABS control is performed for at least one of the front and rear left wheels, the control of the engaging torque proceeds to step 160, and when an affirmative determination is made, the control of the engaging torque proceeds to step 130.

In step 146, a determination is made as to whether or not both the right front wheel 16FR and the right rear wheel 16RR are not under the braking force control by the ABS control. When a negative determination is made, that is, when the braking force control by the ABS control is performed for at least one of the front and rear right wheels, the control of the engaging torque proceeds to step 160, and when an affirmative determination is made, the control of the engaging torque proceeds to step 150.

In the third embodiment when the vehicle 14 is in oversteer state during left turning under braking, affirmative determinations are made in steps 100 and 110. When the braking force control by the ABS control is not performed for the front and rear left wheels that are turning inner wheels, an affirmative determination is made in step 125, and the clutch 24RL on the left rear wheel side is engaged. However, when the braking force control by the ABS control is performed for at least one of the front and rear left wheels, a negative determination is made in step 125, and the clutch 24RL on the left rear wheel side is not engaged.

Similarly, when the vehicle 14 becomes in oversteer state during right turning under braking, an affirmative determination is made in step 100 and a negative determination and an affirmative determination are made in steps 110 and 140, respectively. When the braking force control by the ABS control is not performed for the front and rear right wheels which are the turning inner wheels, an affirmative determination is made in step 145, and the clutch 24RR on the right rear wheel side is engaged. However, when the braking force control by the ABS control is performed on at least one of the front and rear right wheels, a negative determination is made in step 145, and the clutch 24RR on the right rear wheel side is not engaged.

According to the third embodiment, when the vehicle 14 is in oversteer state during turning under braking and the braking force control by the ABS control is not performed for the turning inner front and rear wheels, the clutch on the turning inside is engaged. Therefore, an anti-spin moment can be applied to the vehicle by applying a driving force to the turning inner rear wheel without increasing or decreasing braking forces of the left and right wheels, so that a degree of oversteer state can be reduced.

Further, even if the vehicle 14 is in oversteer state during turning under braking, the clutch on the turning inner side is not engaged if the braking force control by the ABS control is started for at least one of the turning inner front and rear wheels. In addition, in a situation where a braking force is controlled by the ABS control for at least one of the turning inner front and rear wheels, the clutch on the turning inner side is not engaged even if the vehicle 14 becomes in oversteer state during turning under braking. Thus, the wheel speeds of the turning inner front and rear wheels are not influenced mutually. Therefore, it can be avoided, that the braking force control by ABS control is not be properly performed due to the wheel speed of the wheel under braking control by the ABS control being affected by the wheel speed of the longitudinally opposite wheel.

Furthermore, in a situation where the vehicle is turning under braking and i oversteer state, when the braking force control by the ABS control is not performed for the turning inner front and rear wheels, even if the braking control by the ABS control is performed for at least one of the turning outer front and rear wheels, the clutch on the turning inside is engaged. Therefore, while controlling a braking force by the ABS control so that a braking slip ratio is appropriate for at least one of the turning outer front and rear wheels, a driving force can be applied to the turning inner rear wheel to apply an anti-spin moment to the vehicle, so that a degree of oversteer of the vehicle can be reduced. Notably, the front wheel driving torque transmission path 18 is provided with the front wheel differential device 40, and the clutch on the turning outside is disengaged. Therefore, even if the clutch on the turning inside is engaged, the braking force control by the ABS control can be performed without any problem for the turning outer front and rear wheels.

As understood from the above descriptions, according to the first to third embodiments, a degree of oversteer state can be reduced without increasing or decreasing braking forces of the left and right wheels. Thus, operation noise due to opening and closing of the control valves for increasing or decreasing braking pressures, driving of the pump, etc. does not occur, and unnatural movement of a brake pedal accompanying the increase of the braking pressures does not occur. Therefore, it is possible to prevent an occupant or occupants of the vehicle from feeling uncomfortable with the operation noise, and to prevent the driver from feeling uncomfortable with the movement of the brake pedal.

Further, in any of the first to third embodiments, when a degree of oversteer of the vehicle becomes less than the control end reference value, specifically, if an affirmative determination is made in step 80, the clutch on the turning inside is disengaged. Therefore, it is possible to prevent unnecessary continuation of the engagement of the clutch on the turning inside despite the oversteer state of the vehicle being eliminated.

Furthermore, in any of the first to third embodiments, when a degree of oversteer of the vehicle becomes less than the control end reference value, the clutch is disengaged by gradually decreasing the engaging torque of the clutch on the turning inside. Therefore, an anti-spin moment applied to the vehicle can be gradually reduced by gradually reducing a driving force applied to the turning inner rear wheel, so that it is possible to prevent unnatural changes in the vehicle behavior and an occurrence of discomfort due to rapid reduction of the anti-spin moment.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described embodiments, in steps 40 and 60, it is determined whether or not the vehicle is in oversteer state of left turn and right turn by determining whether or not wheel speed differences Vwfr−Vwfl and Vwfl−Vwfr of the front wheels are larger than the reference value Ths, respectively. However, in step 40, it may be determined whether or not the vehicle is in oversteer state of left turn by determining whether or not a wheel speed difference Vwfr−Vwfl of the front wheels is larger than the reference value Ths and a rear wheel speed difference Vwrr−Vwfl of the rear wheels is larger than the reference value Ths. Similarly, in step 60, it may be determined whether or not the vehicle is in oversteer state of right turn by determining whether or not a wheel speed difference Vwfl−Vwfr of the front wheels is larger than the reference value Ths and a wheel speed difference Vwrl−Vwrr of the rear wheels is larger than the reference value Ths.

In the above-described first embodiment, the reference value Ths of the determination in steps 40 and 60 and the reference value The of the determination in step 80 are calculated based on a vehicle speed V such that the reference values become larger positive values as the vehicle speed V increases. However, at least one of the reference values Ths and The may be a positive constant.

Similarly, in the above-described second embodiment, the reference value Thcc of the determination in step 250 and the reference value Thcd of the determination in step 270 are calculated based on a vehicle speed V such that the reference values become larger positive values as the vehicle speed V increases. However, at least one of the reference values Thcc and Thcd may be a positive constant.

In the above-described FIGS. 5 and 9, specific examples are shown in which a driver performs braking operation while a vehicle is turning. However, according to the behavior control apparatus of the present disclosure, even when the vehicle starts turning while the driver performs braking operation, and also when the driver's braking operation and the turning of the vehicle simultaneously start, an anti-spin moment can be applied to the vehicle to eliminate an oversteer state of the vehicle.

Further, in the above-described second embodiment, only the connecting/disconnecting device 90 for connecting and disconnecting the rear wheel driving torque transmission path 20 on the side of the driving unit 12 relative to the speed increasing device 22 is provided. However, in addition to the connecting/disconnecting device 90, another connecting/disconnecting device may be provided for connecting and disconnecting the rear wheel driving torque transmission path 20 on the side of the clutches 24RL and 24RR relative to the speed increasing device 22. In that case, the disconnection and connection of the other connecting/disconnecting device are controlled in the same manner as the connecting/disconnecting device 90 in synchronization with the connecting/disconnecting device 90.

Further, in the above-described second embodiment, in step 270, it is determined whether or not an absolute value of a wheel, speed difference Vwfr−Vwfl of the front wheels is smaller than the reference value Thcd and larger one of the engaging torques Curl and Curr of the two clutches is smaller than the reference value B. However, in step 270, it may be determined whether or not an absolute value of a wheel speed difference Vwfr−Vwfl of the front wheels is smaller than the reference value Thcd or larger one of the engaging torques Curl and Curr of the two clutches is smaller than the reference value B.

What is claimed is:

1. A behavior control apparatus for a four-wheel drive ye hide comprising a driving unit, a front wheel driving torque transmission path that transmits driving torques of the driving unit to left and right front wheels, a rear wheel driving torque transmission path that transmits driving torques of the driving unit to left and right rear wheels, including a speed increasing device for increasing speed of the rear wheels relative to the front wheels and clutches for the left rear wheel and right rear wheel disposed between the speed increasing device and the left rear wheel and the right rear wheel, respectively, and a braking device that applies braking forces to the front wheels and the rear wheels according to braking operation of a driver, wherein the behavior control apparatus comprises a control unit configured to control engagement and disengagement of the clutches for the left, rear wheel and right rear wheel, and the control unit is configured to engage the clutch on a turning inside to make a wheel speed of the turning inside rear wheel higher than a vehicle speed at a position of the turning inside rear wheel if a degree of oversteer of the vehicle exceeds a control start reference value during turning under braking of the vehicle in a situation where the control unit disengages the two clutches.

2. The behavior control apparatus for a four-wheel drive vehicle according to claim 1, wherein the control unit is configured to disengage the clutch on the turning inside when the degree of oversteer of the vehicle falls below a control end reference value smaller than the control start reference value.

3. The behavior control apparatus for a four-wheel drive vehicle according to claim 1, wherein the rear wheel driving torque transmission path includes a connecting disconnecting device that connects and disconnects the rear wheel driving torque transmission path on the side of the driving unit relative to the speed increasing device by being controlled by the control unit, and the control unit is configured to connect the rear wheel driving torque transmission path by the connecting/disconnecting device when the degree of oversteer of the vehicle exceeds the control start reference value in a situation where the vehicle is turning braking and the rear wheel driving torque transmission path is disconnected by the connecting/disconnecting device.

4. The behavior control apparatus for a four-wheel drive vehicle according to claim 1, wherein the control unit is configured to disengage the clutch on the turning inside when a braking force is controlled by anti-skid control on at least one of a turning inner front wheel and a turning inner rear wheel even if the degree of oversteer of the vehicle exceeds the control start reference value.

5. The behavior control apparatus for a four-wheel drive vehicle according to claim 1, wherein the control unit is configured to engage the clutch on the turning inside even if a braking force is controlled by anti-skid control for at least one of a turning outer front wheel and a turning outer rear wheel in a situation where the degree of oversteer of the vehicle exceeds the control start reference value.

* * * * *

UNITED STATES PATENT AND TRADEMARK OFFICE
CERTIFICATE OF CORRECTION

PATENT NO. : 10,780,779 B2  
APPLICATION NO. : 16/512821  
DATED : September 22, 2020  
INVENTOR(S) : Ryochi Watanabe Page 1 of 3

It is certified that error appears in the above-identified patent and that said Letters Patent is hereby corrected as shown below:

On the Title Page

Item (72), Inventor, city information, delete "Susono" and insert --Susono-shi Shizuoka-ken--, therefor.

Item (57), Line(s) 8, after "left rear", delete "w heel" and insert --wheel--, therefor.

Item (57), Line(s) 9, after "speed", delete ",".

In the Specification

In Column 1, Line(s) 8, after "Jul.", delete "7" and insert --27--, therefor.

In Column 2, Line(s) 9, delete "pat h" and insert --path--, therefor.

In Column 2, Line(s) 10, delete "t he" and insert --the--, therefor.

In Column 2, Line(s) 12, after "right rear", delete "w heel" and insert --wheel--, therefor.

In Column 2, Line(s) 13, delete "t his" and insert --this--, therefor.

In Column 2, Line(s) 18, after "later", insert --,--.

In Column 2, Line(s) 42, delete "loft" and insert --left--, therefor.

In Column 3, Line(s) 4, delete "s peed" and insert --speed--, therefor.

In Column 3, Line(s) 27, after "disclosure", insert --,--.

In Column 3, Line(s) 40, delete "correcting" and insert --connecting--, therefor.

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,780,779 B2

In Column 4, Line(s) 49, after "FIG. 1", insert --is--.

In Column 4, Line(s) 50, after "embodiment", insert --of--.

In Column 5, Line(s) 57, after "driving", delete ".".

In Column 6, Line(s) 12, delete "b" and insert --by--, therefor.

In Column 6, Line(s) 42, after "driven", delete ",".

In Column 6, Line(s) 59, delete "62FRL" and insert --62RL--, therefor.

In Column 7, Line(s) 7, delete "16R" and insert --16RL--, therefor.

In Column 7, Line 13, after "oil pump", delete "." and insert --,--, therefor.

In Column 8, Line(s) 33, after "controlling", delete ".".

In Column 9, Line(s) 1, delete "Vsfl" and insert --Vwfl--, therefor.

In Column 9, Line(s) 10, after "determination", delete "," and insert --.--, therefor.

In Column 9, Line(s) 22, after "140", delete "," and insert --.--, therefor.

In Column 9, Line(s) 34, delete "control led" and insert --controlled--, therefor.

In Column 10, Line(s) 20, delete "Liming" and insert --turning--, therefor.

In Column 10, Line(s) 23, after "60", delete "," and insert --.--, therefor.

In Column 10, Line(s) 42, after "but", insert --under--.

In Column 11, Line(s) 12, after "1 km/h", delete ",".

In Column 13, Line(s) 43, after "connecting", insert --/--.

In Column 13, Line(s) 60, after "250", insert --,--.

In Column 13, Line(s) 66, delete "16F" and insert --16FR--, therefor.

In Column 14, Line(s) 29, delete "our-wheel" and insert --four-wheel--, therefor.

In Column 15, Line(s) 10, delete "lime" and insert --time--, therefor.

In Column 15, Line(s) 12, delete "14" and insert --t4--, therefor.

CERTIFICATE OF CORRECTION (continued)
U.S. Pat. No. 10,780,779 B2

In Column 15, Line(s) 22, delete "13" and insert --t3--, therefor.

In Column 15, Line(s) 51, after "respectively", delete "," and insert --.--, therefor.

In Column 15, Line(s) 61, delete "146" and insert --145--, therefor.

In Column 16, Line(s) 3, after "embodiment", insert --,--.

In Column 16, Line(s) 47, after "avoided", delete ",".

In Column 16, Line(s) 53, delete "i" and insert --in--, therefor.

In Column 17, Line(s) 49, delete "Vwrr-Vwfl" and insert --Vwrr-Vwrl--, therefor.

In Column 18, Line(s) 28, after "wheel", delete ",".

In the Claims

In Column 18, Line(s) 38 & 39, Claim 1, delete "ye hide" and insert --vehicle--, therefor.

In Column 18, Line(s) 53, Claim 1, after "left", delete ",".

In Column 19, Line(s) 3, Claim 3, after "connecting", insert --/--.